United States Patent

[11] 3,630,482

[72] Inventor Wilbert E. Beller
     Park Ridge, Ill.
[21] Appl. No. 885,907
[22] Filed Dec. 17, 1969
[45] Patented Dec. 28, 1971
[73] Assignee Controls Company of America
     Melrose Park, Ill.
     Continuation-in-part of application Ser. No. 830,597, June 5, 1969, now abandoned. This application Dec. 17, 1969, Ser. No. 885,907

[54] SOLENOID-OPERATED VALVE HAVING A PLASTIC SOLENOID GUIDE TUBE
     1 Claim, 1 Drawing Fig.
[52] U.S. Cl. .................................... 251/30, 251/129
[51] Int. Cl. .................................... F16k 31/06
[50] Field of Search .......................... 251/30, 141, 129

[56] References Cited
     UNITED STATES PATENTS
     2,936,780  5/1960  Pratt ........................... 251/30 X
     3,362,679  1/1968  Le Wan ....................... 251/30 X
     3,415,487  12/1968  Robarge ..................... 251/30 X FOREIGN PATENTS
     922,034    3/1963  Great Britain ............ 251/30
     1,108,572  4/1968  Great Britain ............ 251/129
     1,206,672  8/1959  France ..................... 251/30

Primary Examiner—Arnold Rosenthal
Attorneys—John W. Michael, Gerrit D. Foster, Bayard H. Michael, Paul R. Puerner, Joseph A. Gemignani, Andrew O. Riteris, Daniel Van Dyke and Spencer B. Michael ABSTRACT: The pilot-operated diaphragm valve is controlled by a solenoid-actuated plunger guided in a plastic tube having a very thin wall to minimize the loss of magnetic coupling while providing freedom from corrosion and electrolysis with reduced wear and substantial reduction or elimination of vibration buzz or hum. The plastic guide is supported throughout its thin wall length by upper and lower flux sleeves of magnetic material separated by a nonmagnetic material which in this case is a portion of the plastic coil bobbin but can alternatively be any nonmagnetic material. The extended lip on the plastic tube helps seal the diaphragm and prevents extrusion of the diaphragm under high pressure. The flat valve face seating on the rigid valve seat insert in the diaphragm alleviates centering problems and allows increased clearance between the plunger and tube.

Patented Dec. 28, 1971
3,630,482
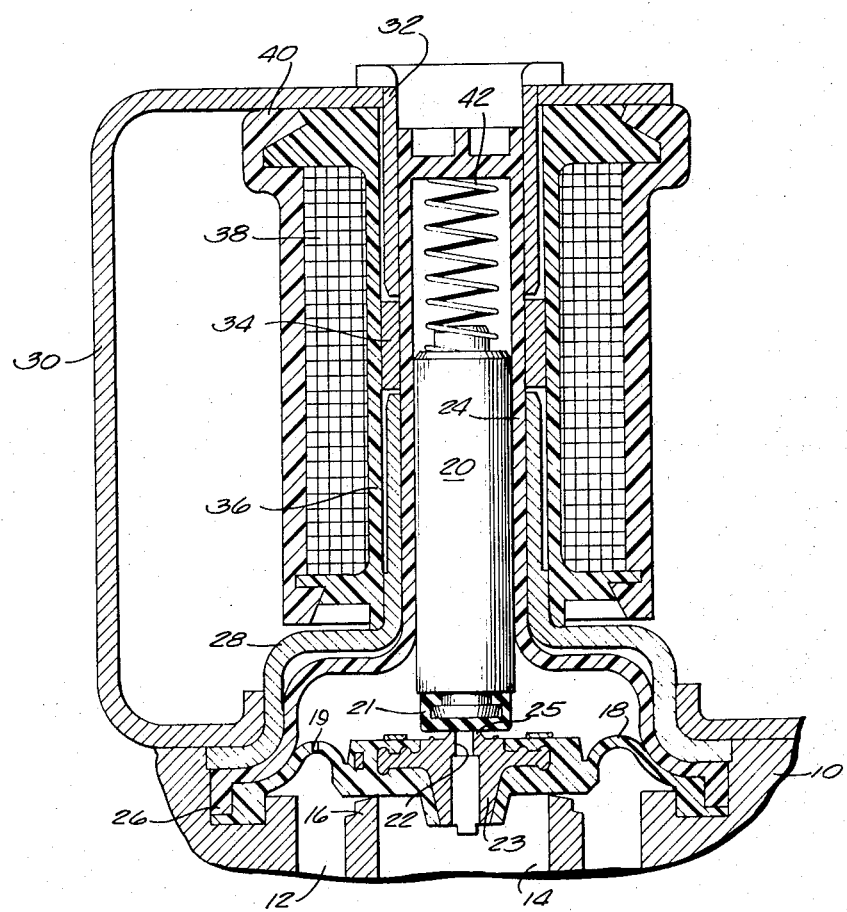
Inventor
Wilbert E. Beller
By Bayard H. Michael
Attorney

SOLENOID-OPERATED VALVE HAVING A PLASTIC SOLENOID GUIDE TUBE

CROSS-REFERENCES TO RELATED APPLICATIONS

This application is a continuation-in-part of U.S. Pat. application Ser. No. 830,597, filed June 5, 1969, and now abandoned.

BACKGROUND OF INVENTION

Pilot-operated water valves of the type shown here have long been used, particularly in the appliance industry. The plunger guide sleeve has traditionally been metallic but corrosion and electrolysis would take place and the fit was impaired and could cause valve failure. Particles lodged between the plunger and its guide could cause the plunger to hang up. Proper sealing of the diaphragm has sometimes caused difficulties.

SUMMARY OF INVENTION

By modifying the construction of the magnetic circuit to insure complete support for a plastic guide, it is possible to utilize a very thin-wall plastic guide with a substantial increase in performance and reduction in noise. The extended lip on the guide aids in sealing the diaphragm and prevents extrusion of the diaphragm under high pressure (Underwriters' Laboratories testing requires 1,000 p.s.i.). The increased clearance between the plunger and the guide means larger particles which get past the usual filter can be tolerated without causing the plunger to bind in the guide.

DESCRIPTION OF DRAWING

The single FIGURE is a vertical section through a valve provided with the novel guide.

DESCRIPTION OF PREFERRED EMBODIMENT

Valve body 10 is provided with an annular inlet 12 leading to outlet 14 separated by the valve seat 16 against which the diaphragm 18 seats. The diaphragm is customarily provided with a small hole 19 therethrough permitting water to flow to the upper side of the diaphragm and the solenoid plunger 20 controls flow through the center vent 22 in the rigid insert 23 molded into diaphragm 18. Simply by controlling the center opening of the diaphragm, the flow from inlet 12 to outlet 14 is controlled. This type of valve is well known. The plunger 20 in this instance is provided with a resilient tip 20 which has a flat face which only needs to seat on the raised seating surface 25 surrounding the vent 22. Registration of the valve face with the seat 25 is no problem. Therefore, the plunger need not be guided as accurately as previously required and the clearance is doubled with no problem but with the ability to tolerate greater particles between the plunger and guide.

The solenoid is guided in a thin-wall plastic tube 24, the lower end of which is belled and shaped to seat in the annular groove 26 in the valve body outside of the diaphragm. It is held in sealing engagement with the diaphragm by the lower flux sleeve 28 and the seal thus obtained is superior to prior designs. Nylon is used as the guide material and, being nonrigid, facilitates the sealing and aids in preventing extrusion of the diaphragm when subjected to 1,000 p.s.i. as required in the Underwriters' Laboratories approval tests. The lower flux sleeve is pressed into the generally U-shaped frame 30 which, in turn, is secured to the valve body. An upper flux sleeve 32 is pressed into the upper end of the frame 30 to surround the upper end of the plastic sleeve. The ends of the two flux sleeves are separated by the annular, nonmagnetic, metallic sleeve 34 which enhances heat transfer. If desired, the sleeve may be omitted but the sleeve does reinforce the plastic. The flux sleeves serve as a magnetic flux path concentrating the magnetic flux from the coil to the air gap between the flux sleeves and picking up the upper end of the magnetic stainless steel plunger 20. When the coil is energized, the plunger will be lifted against the force of the spring 42.

It will be noted that the sleeve or tube is supported throughout its axial length by the flux sleeves and the spacer which, in this case, is integral with the bobbin. This permits the wall thickness to be very small and thereby minimize the air gap between the plunger and the magnetic circuit while obtaining the benefits of the plastic material which is preferably nylon although other plastics will obviously serve the purpose. The nylon is noncorrosive and provides good wear characteristics to minimize any interference with the free movement of the plunger in the tube. The nylon also serves to damp or eliminate the usual 60-cycle hum associated with AC water valves. There is no electrolysis between the tube and the plunger.

It will be noted the upper end of the tube is considerably thicker to withstand the pressures at that point where it is not supported by outside metal parts. The lower flux sleeve 28 not only provides radial support but also provides axial support for the tube. The curved portion of the enlarged lower end of the tube can obviously be built up to withstand greater pressures at that point and need only provide adequate clearance for movement of the diaphragm into the space above the diaphragm as it is pictured.

What is claimed is:
1. A solenoid valve comprising
 a magnetic frame,
 a coil mounted in the frame,
 magnetic flux sleeves extending from the frame into the coil from opposite ends of the coil,
 a nonmagnetic spacer sleeve between the facing ends of the flux sleeves,
 the inside diameters of the sleeves being substantially the same,
 a nonmagnetic thin-walled plastic tube inside the sleeves and radially supported by the sleeves when subjected to pressure,
 the upper end of the tube being closed and thickened to be self-supporting under pressure,
 a magnetic valve-plunger in the plastic tube to be magnetically coupled by the flux between the flux sleeves,
 said valve being mounted on a body and including a diaphragm,
 the lower end of the lower flux sleeve and the lower end of the tube both being belled to accommodate flexure of the diaphragm,
 both the diaphragm and the belled end of the tube being seated in an annular groove in the body and held therein by the belled lower sleeve.

* * * * *